(Model.)

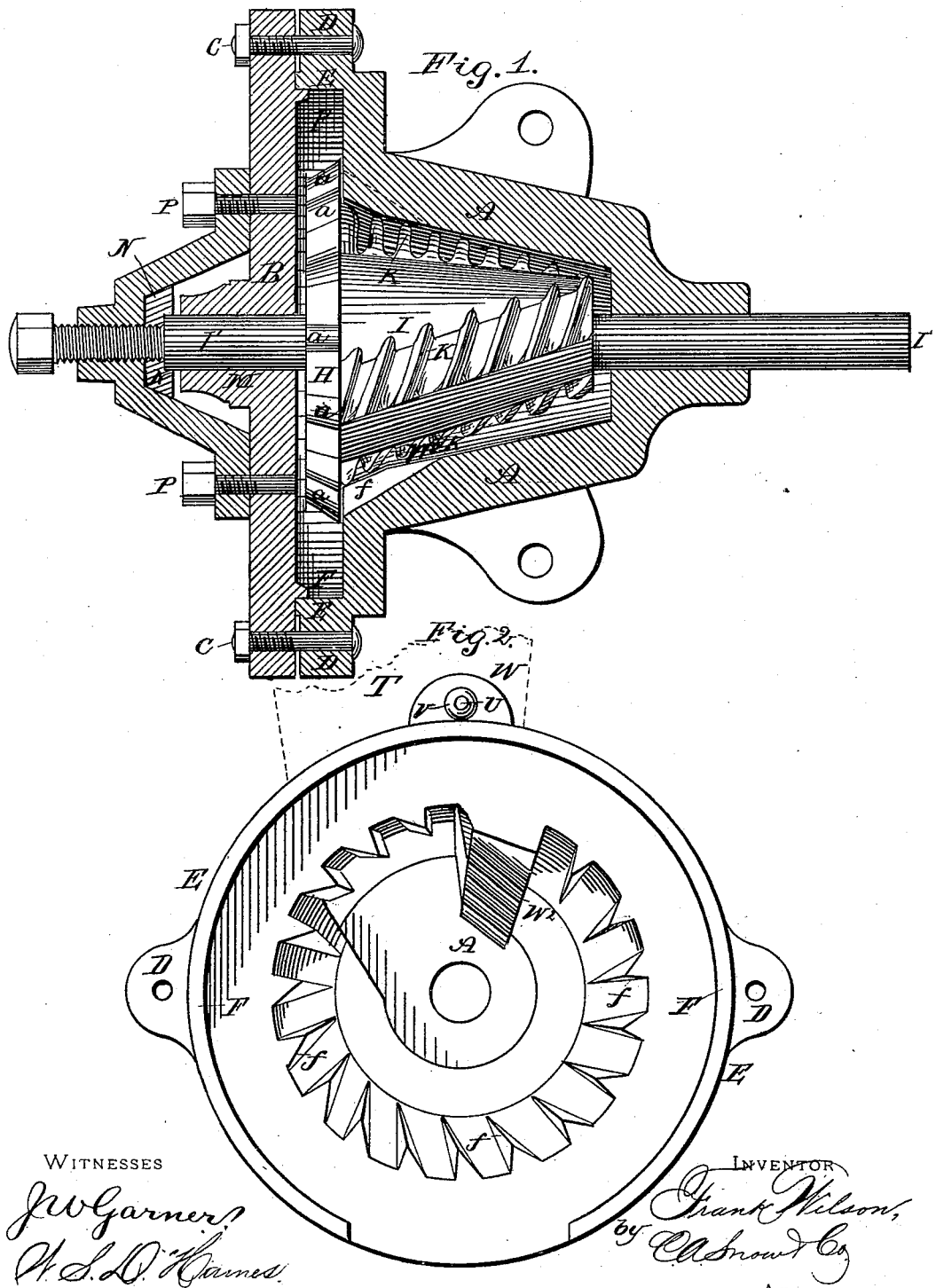

2 Sheets—Sheet 2.

F. WILSON.
GRINDING MILL.

No. 246,356. Patented Aug. 30, 1881.

WITNESSES
J. W. Garner
W. S. D. Haines

INVENTOR
F. Wilson,
by C. A. Snow & Co.
ATTORNEYS

N. PETERS, Photo-Lithographer, Washington, D. C.

UNITED STATES PATENT OFFICE.

FRANK WILSON, OF EASTON, PENNSYLVANIA.

GRINDING-MILL.

SPECIFICATION forming part of Letters Patent No. 246,356, dated August 30, 1881.

Application filed April 9, 1881. (Model.)

*To all whom it may concern:*

Be it known that I, FRANK WILSON, of Easton, in the county of Northampton and State of Pennsylvania, have invented certain new and useful Improvements in Grinding-Mills; and I do hereby declare that the following is a full, clear, and exact description of the invention, which will enable others skilled in the art to which it appertains to make and use the same, reference being had to the accompanying drawings, which form a part of this specification.

The object of this invention is to provide a mill for grinding up bones and shells.

The improvement consists in the features of construction and combination hereinafter fully described, and particularly pointed out in the claim.

Figure 3:
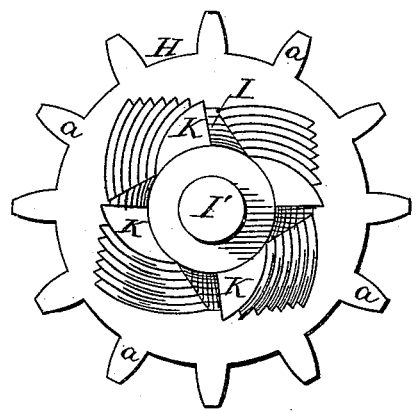
Figure 4:
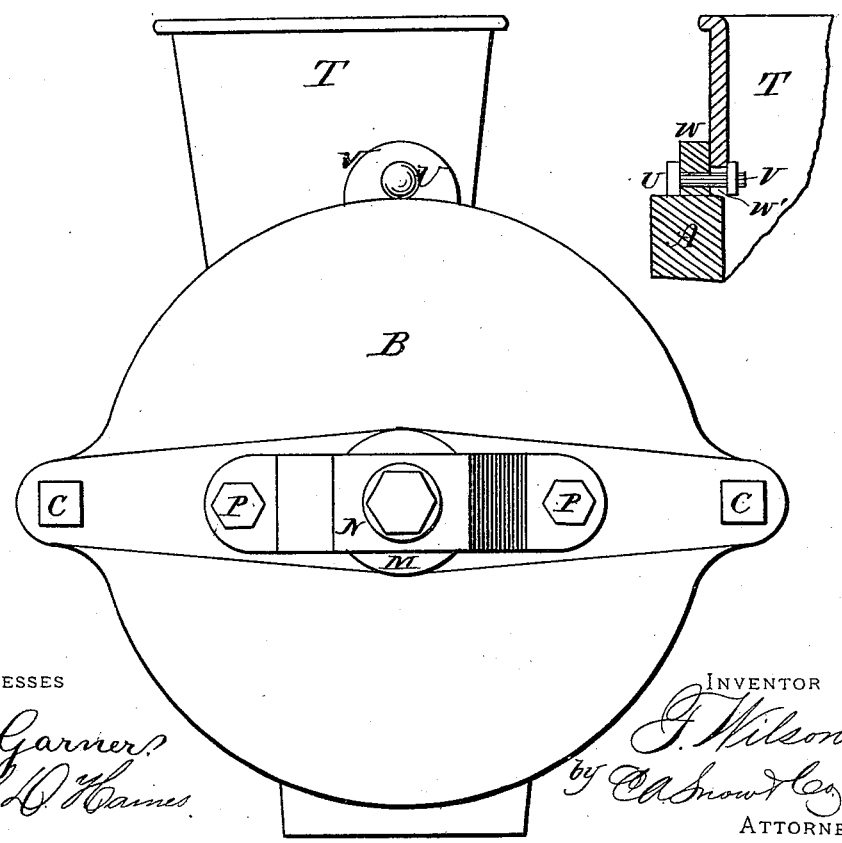
Figure 5:
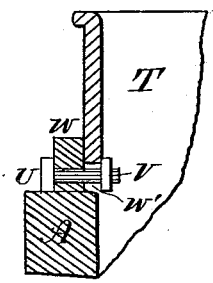

In the drawings, Figure 1 is a longitudinal central section of my improved mill. Fig. 2 is an end view of the conical shell that incloses the grinding-cylinder, and shows the interior of said shell. Fig. 3 represents the grinding-cylinder detached, and Fig. 4 is an end view of the cap-plate of the conical shell. Fig. 5 is a detached view.

A indicates the conical shell; and B, the cap-plate, that is secured to the shell by means of bolts C passing through the cap-plate, and lugs D that are formed upon an annular flange, E. This annular flange is formed around the periphery of the flange F, with which the larger end of the conical shell is provided, and when the said conical shell and the cap-plate are thus united a chamber will be formed for the disk H, that is either secured to or cast in one piece with the conical grinding-cylinder I.

The conical grinding-cylinder is formed with specially-arranged lines of teeth K, the inner face of the disk H being left plain.

The flange F is provided with teeth $ff$, and the disk upon the conical shell is provided with teeth $a\,a$ upon its periphery.

One end of the shaft $I'$ of the grinding-cylinder and disk is journaled in the smaller end of the conical shell A, while the remaining end of said shaft is journaled in the cap-plate. This latter end of the shaft passes through the hub M of the cap-plate, and its extreme end works in a concavity formed in a yoke or block, N, that is held by means of nuts upon bolts P P projecting out from the cap-plate. By tightening up these nuts the yoke or block can be brought to bear against the shaft, so as to adjust the teeth of the grinding-cylinder more closely to the corrugations of the conical shell, whereby the teeth of the disk will likewise be brought more closely to the teeth of the flange F, and thus the shells or bones will be more finely ground.

T indicates the hopper, which is detachably secured to the conical shells by means of a bolt, U, and the nut V upon said bolt. This bolt passes through a lug, W, upon the flange E, and also through a slot, $W'$, formed in one of the sides of the hopper. The inner wall of the shell is provided with cutters or scrapers $W^2$, between which the teeth of the grinding-cylinder pass. The cutters $W^2$ upon the inner wall of the conical shell run in lines spirally arranged with regard to the axis of the shell.

By arranging the several sets of teeth and the set of corrugated scrapers as herein set forth, I am enabled to grind up bones or oyster-shells in a rapid and effective manner.

What I claim, and desire to secure by Letters Patent, is—

As an improvement in grinding-mills, the combination of the cone-shell A, cap B, having hub M, with the shaft $I'$, cone I K, disk H $a$, and teeth $w^2 f$, and the yoke or block N, substantially as and for the purpose herein shown and specified.

In testimony that I claim the foregoing as my own I have hereto affixed my signature in presence of two witnesses.

FRANK WILSON.

Witnesses:
JOHN L. WILSON,
J. F. WIDEMAN.